United States Patent
Eyer et al.

(10) Patent No.: US 12,160,631 B2
(45) Date of Patent: Dec. 3, 2024

(54) HIDDEN REPLACEABLE MEDIA SLOTS

(71) Applicant: SATURN LICENSING LLC, New York, NY (US)

(72) Inventors: Mark Eyer, Woodinville, WA (US); Paul Hearty, Poway, CA (US)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 16/230,782

(22) Filed: Dec. 21, 2018

(65) Prior Publication Data

US 2019/0124396 A1 Apr. 25, 2019

Related U.S. Application Data

(63) Continuation of application No. 14/810,004, filed on Jul. 27, 2015, now Pat. No. 10,205,991.

(51) Int. Cl.
*H04N 21/44* (2011.01)
*H04N 21/2343* (2011.01)
(Continued)

(52) U.S. Cl.
CPC . *H04N 21/44008* (2013.01); *H04N 21/23439* (2013.01); *H04N 21/2351* (2013.01);
(Continued)

(58) Field of Classification Search
CPC ....... H04N 21/44008; H04N 21/23439; H04N 21/812; H04N 21/8543; H04N 21/26258; H04N 21/4825
See application file for complete search history.

(56) References Cited

U.S. PATENT DOCUMENTS 8,595,783 B2 11/2013 Dewa
8,705,933 B2 4/2014 Eyer
(Continued)

FOREIGN PATENT DOCUMENTS

EM 2 863 641 A1 4/2015

OTHER PUBLICATIONS

Notification of Transmittal of the International Search Report and the Written Opinion of the International Searching Authority, or the Declaration issued Jul. 29, 2016, in International Application No. PCT/US16/38508, 13 pages.
(Continued)

*Primary Examiner* — Frank Johnson
(74) *Attorney, Agent, or Firm* — Chris Kolefas

(57) ABSTRACT

Determining and hiding a replaceable period of a MP (Media Presentation). A method for determining includes receiving a first MPD (Media Presentation Description) that identifies a predetermined period and at least one media segment of the MP to be presented during the predetermined period. A determination is made as to whether the first MPD includes additional data to be resolved by an application. The additional data is provided to the application when the first MPD is determined to include the additional data. Additional period information is received from the application. A second MPD is generated based on the received additional period information. The MP is output for display to a user based on the second MPD. Each of a subset of the at least one media segment for a replaceable sub-period of the MP is replaceable with an alternate media segment.

21 Claims, 15 Drawing Sheets

(51) Int. Cl.
  *H04N 21/235* (2011.01)
  *H04N 21/435* (2011.01)
  *H04N 21/81* (2011.01)
  *H04N 21/845* (2011.01)
  *H04N 21/8543* (2011.01)

(52) U.S. Cl.
  CPC ....... *H04N 21/4353* (2013.01); *H04N 21/812* (2013.01); *H04N 21/8456* (2013.01); *H04N 21/8543* (2013.01)

(56) References Cited

U.S. PATENT DOCUMENTS

| | | |
|---|---|---|
| 8,839,338 B2 | 9/2014 | Eyer |
| 8,842,974 B2 | 9/2014 | Kitazato |
| 8,863,171 B2 | 10/2014 | Blanchard et al. |
| 8,872,888 B2 | 10/2014 | Kitazato |
| 8,875,169 B2 | 10/2014 | Yamagishi |
| 8,875,204 B2 | 10/2014 | Kitazato |
| 8,884,800 B1 | 11/2014 | Fay |
| 8,886,009 B2 | 11/2014 | Eyer |
| 8,892,636 B2 | 11/2014 | Yamagishi |
| 8,893,210 B2 | 11/2014 | Eyer |
| 8,896,755 B2 | 11/2014 | Kitazato et al. |
| 8,898,720 B2 | 11/2014 | Eyer |
| 8,904,417 B2 | 12/2014 | Kitahara et al. |
| 8,908,103 B2 | 12/2014 | Kitazato |
| 8,909,694 B2 | 12/2014 | Yamagishi et al. |
| 8,914,832 B2 | 12/2014 | Yamagishi |
| 8,917,358 B2 | 12/2014 | Eyer |
| 8,918,801 B2 | 12/2014 | Kitazato et al. |
| 8,925,016 B2 | 12/2014 | Eyer |
| 8,930,988 B2 | 1/2015 | Kitazato et al. |
| 8,938,756 B2 | 1/2015 | Kitazato |
| 8,941,779 B2 | 1/2015 | Eyer |
| 8,966,564 B2 | 2/2015 | Kitazato |
| 8,988,612 B2 | 3/2015 | Kitazato |
| 8,989,723 B2 | 3/2015 | Coppinger et al. |
| 9,015,785 B2 | 4/2015 | Yamagishi |
| 9,038,095 B2 | 5/2015 | Fay et al. |
| 9,043,857 B2 | 5/2015 | Dewa |
| 9,078,031 B2 | 7/2015 | Kitazato et al. |
| 2011/0088075 A1 | 4/2011 | Eyer |
| 2011/0243536 A1 | 10/2011 | Eyer |
| 2011/0246488 A1 | 10/2011 | Eyer |
| 2011/0247028 A1 | 10/2011 | Eyer |
| 2011/0298981 A1 | 12/2011 | Eyer |
| 2011/0299827 A1 | 12/2011 | Eyer |
| 2011/0302599 A1 | 12/2011 | Eyer |
| 2011/0302611 A1 | 12/2011 | Eyer |
| 2012/0050619 A1 | 3/2012 | Kitazato et al. |
| 2012/0054214 A1 | 3/2012 | Yamagishi et al. |
| 2012/0054235 A1 | 3/2012 | Kitazato et al. |
| 2012/0060197 A1 | 3/2012 | Kitahara et al. |
| 2012/0063508 A1 | 3/2012 | Hattori et al. |
| 2012/0072965 A1 | 3/2012 | Dewa |
| 2012/0081607 A1 | 4/2012 | Kitazato |
| 2012/0084802 A1 | 4/2012 | Kitazato |
| 2012/0185888 A1 | 7/2012 | Eyer et al. |
| 2012/0253826 A1 | 10/2012 | Kitazato et al. |
| 2013/0024894 A1 | 1/2013 | Eyer |
| 2013/0036440 A1 | 2/2013 | Eyer |
| 2013/0055313 A1 | 2/2013 | Eyer |
| 2013/0103716 A1 | 4/2013 | Yamagishi |
| 2013/0191860 A1 | 7/2013 | Kitazato et al. |
| 2013/0201399 A1 | 8/2013 | Kitazato et al. |
| 2013/0205327 A1 | 8/2013 | Eyer |
| 2013/0212634 A1 | 8/2013 | Kitazato |
| 2013/0254824 A1 | 9/2013 | Eyer |
| 2013/0282870 A1 | 10/2013 | Dewa et al. |
| 2013/0283311 A1 | 10/2013 | Eyer |
| 2013/0283328 A1 | 10/2013 | Kitazato |
| 2013/0291022 A1 | 10/2013 | Eyer |
| 2013/0340007 A1 | 12/2013 | Eyer |
| 2014/0013347 A1 | 1/2014 | Yamagishi |
| 2014/0013379 A1 | 1/2014 | Kitazato et al. |
| 2014/0040026 A1* | 2/2014 | Swaminathan ........ G06Q 30/02 705/14.53 |
| 2014/0040965 A1 | 2/2014 | Kitazato et al. |
| 2014/0040968 A1 | 2/2014 | Kitazato et al. |
| 2014/0043540 A1 | 2/2014 | Kitazato et al. |
| 2014/0053174 A1 | 2/2014 | Eyer et al. |
| 2014/0067922 A1 | 3/2014 | Yamagishi et al. |
| 2014/0099078 A1 | 4/2014 | Kitahara et al. |
| 2014/0122528 A1 | 5/2014 | Yamagishi |
| 2014/0137153 A1 | 5/2014 | Fay et al. |
| 2014/0137165 A1 | 5/2014 | Yamagishi |
| 2014/0150019 A1* | 5/2014 | Ma ..................... G06Q 30/0251 725/34 |
| 2014/0150040 A1 | 5/2014 | Kitahara et al. |
| 2014/0156865 A1* | 6/2014 | Giladi ................... H04L 65/608 709/231 |
| 2014/0157304 A1 | 6/2014 | Fay et al. |
| 2014/0186008 A1 | 7/2014 | Eyer |
| 2014/0201335 A1 | 7/2014 | Wang |
| 2014/0208375 A1 | 7/2014 | Fay et al. |
| 2014/0208380 A1 | 7/2014 | Fay et al. |
| 2014/0229580 A1 | 8/2014 | Yamagishi |
| 2014/0229979 A1 | 8/2014 | Kitazato et al. |
| 2014/0253683 A1 | 9/2014 | Eyer et al. |
| 2014/0281556 A1 | 9/2014 | Mao et al. |
| 2014/0327825 A1 | 11/2014 | Eyer |
| 2014/0348448 A1 | 11/2014 | Eyer |
| 2014/0351877 A1 | 11/2014 | Eyer |
| 2014/0354890 A1 | 12/2014 | Eyer |
| 2014/0365759 A1* | 12/2014 | Wang ................... H04L 63/0428 713/151 |
| 2015/0007215 A1 | 1/2015 | Fay et al. |
| 2015/0007219 A1 | 1/2015 | Blanchard et al. |
| 2015/0007242 A1 | 1/2015 | Fay |
| 2015/0012588 A1 | 1/2015 | Yamagishi |
| 2015/0012955 A1 | 1/2015 | Kitazato |
| 2015/0019629 A1* | 1/2015 | Giladi ..................... H04L 67/02 709/203 |
| 2015/0020146 A1 | 1/2015 | Eyer |
| 2015/0026730 A1 | 1/2015 | Eyer |
| 2015/0026739 A1 | 1/2015 | Kitazato |
| 2015/0033023 A1* | 1/2015 | Xu ..................... H04N 21/4627 713/176 |
| 2015/0033280 A1 | 1/2015 | Fay |
| 2015/0038100 A1 | 2/2015 | Fay |
| 2015/0046937 A1 | 2/2015 | Kitazato et al. |
| 2015/0046942 A1 | 2/2015 | Eyer |
| 2015/0058410 A1 | 2/2015 | Yamagishi et al. |
| 2015/0058875 A1 | 2/2015 | Kitahara et al. |
| 2015/0058906 A1 | 2/2015 | Kitazato et al. |
| 2015/0058911 A1 | 2/2015 | Kitazato et al. |
| 2015/0062428 A1 | 3/2015 | Eyer |
| 2015/0067713 A1 | 3/2015 | Yamagishi |
| 2015/0074704 A1 | 3/2015 | Kitazato |
| 2015/0081851 A1* | 3/2015 | Oyman ................... H04L 65/60 709/219 |
| 2015/0082367 A1 | 3/2015 | Kitazato |
| 2015/0100997 A1 | 4/2015 | Kitazato |
| 2015/0121484 A1* | 4/2015 | Liu ........................ H04L 63/08 726/5 |
| 2015/0163557 A1 | 6/2015 | Kitazato |
| 2015/0195605 A1 | 7/2015 | Eyer |
| 2015/0215673 A1 | 7/2015 | Yamagishi |
| 2015/0269629 A1* | 9/2015 | Lo ..................... G06Q 30/0269 705/14.66 |
| 2015/0271237 A1* | 9/2015 | Stockhammer ...... H04N 21/812 709/219 |
| 2016/0315956 A1* | 10/2016 | Giladi ..................... H04L 67/02 |
| 2016/0337679 A1* | 11/2016 | Lee ................. H04N 21/23439 |
| 2016/0360288 A1* | 12/2016 | Mandyam ............ H04N 21/242 |
| 2017/0006315 A1* | 1/2017 | Giladi ............... H04N 21/2353 |
| 2017/0339204 A1* | 11/2017 | Tang ....................... H04L 67/02 |

OTHER PUBLICATIONS

International Search Report issued Jul. 29, 2016 in PCT Application No. PCT/US16/38508.

(56) References Cited

OTHER PUBLICATIONS

EESR for corresponding EP16830987.0, dated Nov. 16, 2018.

* cited by examiner

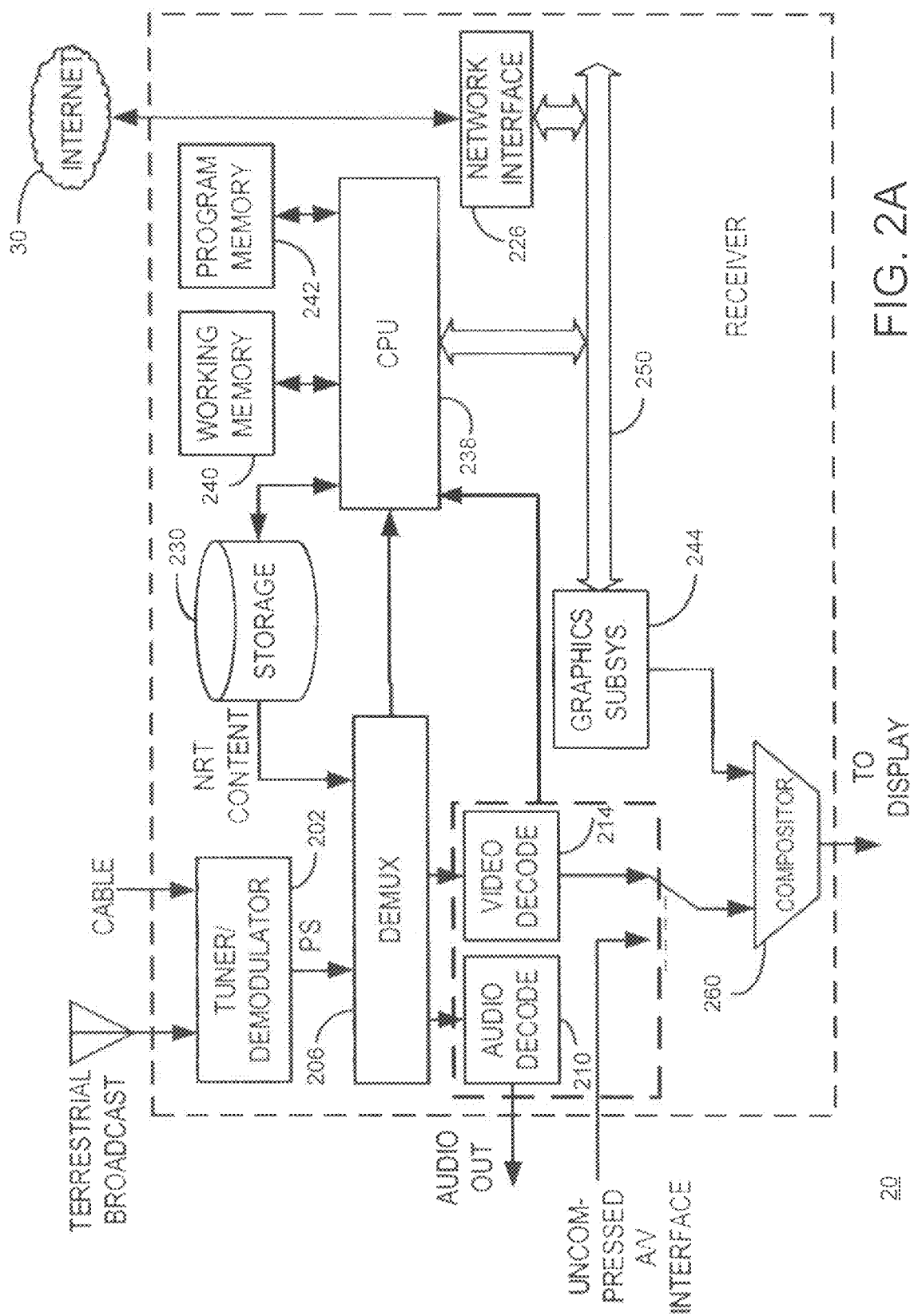

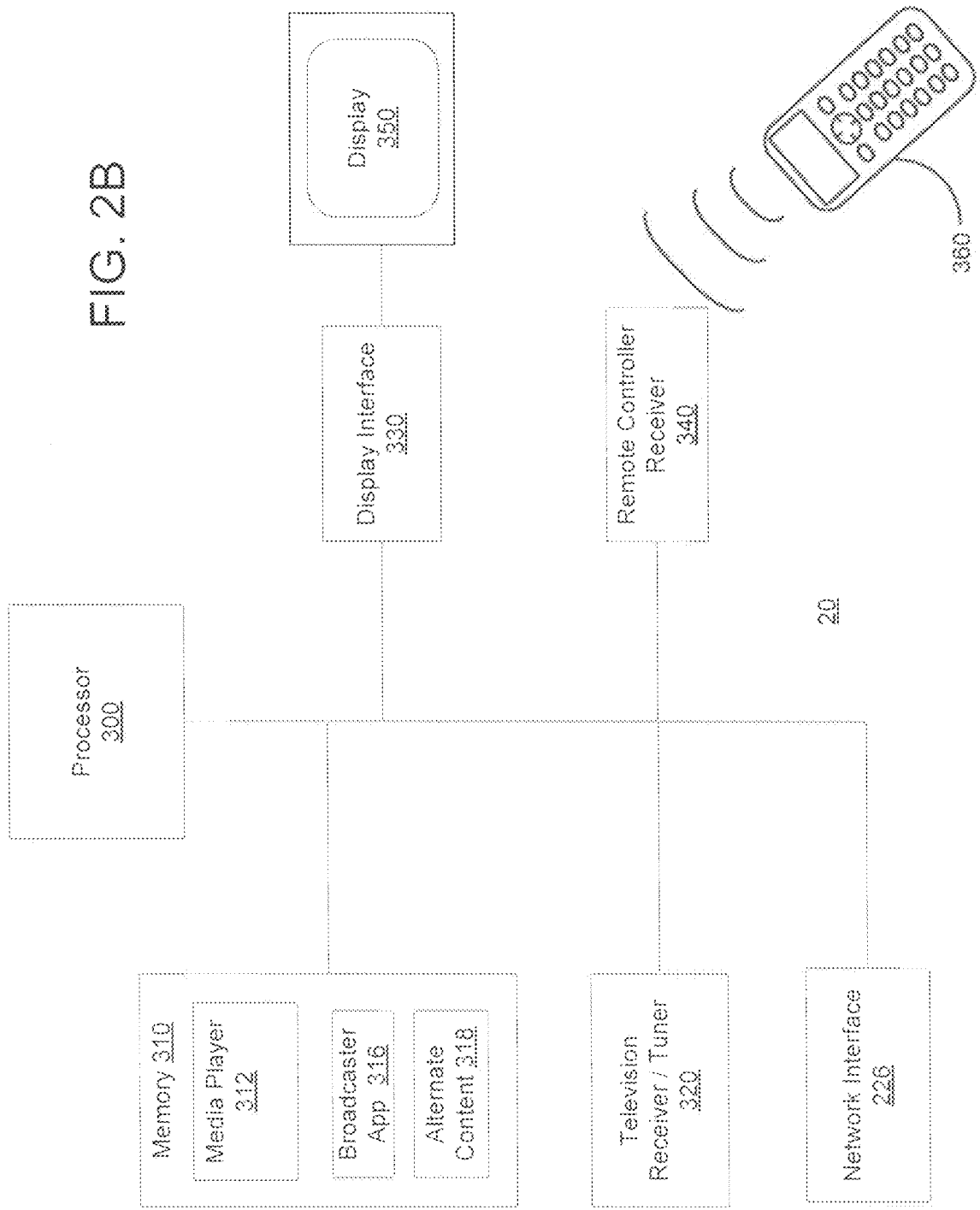

MPD 502

Period 504

Replaceable Sub-Period P2

FIG. 5A

```
<MPD type="dynamic" ... availabilityStartTime="2016-07-01T00:00:00Z">
..
<Period start="PT0S" duration="PT1D" xlink:href="urn:xbc?d=2016-07-01&s=4A92D34409ZA9A09eC35" >
    <AdaptationSet mimeType="video/mp4" ... >
        <SegmentTemplate timescale="90000" ... media="xbc-$Number$.mp4v" duration="90000" />
        <Representation id="v2" width="1920" height="1080" ... />
    </AdaptationSet>
</Period>
</MPD>
```

FIG. 5B

```
<MPD type="dynamic" ... availabilityStartTime="2016-07-01T00:00:00Z" >
  ...
  <Period start="PT0S" >
    <AdaptationSet mimeType="video/mp4" ... >
      <SegmentTemplate timescale="90000" ... media="xbc-$Number$.mp4v" duration="90000" />
      <Representation id="v2" width="1920" height="1080" ... />
    </AdaptationSet>
  </Period>
  <Period start="PT9H" >
    <AdaptationSet mimeType="video/mp4" ... >
      <SegmentTemplate timescale="90000" ... media="xbc-$Number$.mp4v" duration="90000"
        startNumber="32401" />
      <Representation id="v2" width="1920" height="1080" ... />
    </AdaptationSet>
  </Period>
  <Period start="PT9H0M30S" >
    <AdaptationSet mimeType="video/mp4" ... >
      <SegmentTemplate timescale="90000" ... media="xbc-$Number$.mp4v" duration="90000"
        startNumber="32431" />
      <Representation id="v2" width="1920" height="1080" ... />
    </AdaptationSet>
  </Period>
</MPD>
```
} P2

FIG. 7A

```
<MPD type="dynamic" ... availabilityStartTime="2016-07-01T00:00:00Z">
..
<Period start="PT0S" >
  <AdaptationSet mimeType="video/mp4" ... >
    <SegmentTemplate timescale="90000" ... media="xbc-$Number$.mp4v" duration="90000" />
    <Representation id="v2" width="1920" height="1080" ... />
  </AdaptationSet>
</Period>
<Period start="PT9H" >
  <AdaptationSet mimeType="video/mp4" ... >
    <SegmentTemplate timescale="90000" ... media="newad-$Number$.mp4v" duration="90000"
startNumber="32401" />
    <Representation id="v2" width="1920" height="1080" ... />
  </AdaptationSet>
</Period>
<Period start="PT9H0M30S" >
  <AdaptationSet mimeType="video/mp4" ... >
    <SegmentTemplate timescale="90000" ... media="xbc-$Number$.mp4v" duration="90000"
startNumber="32431" />
    <Representation id="v2" width="1920" height="1080" ... />
  </AdaptationSet>
</Period>
</MPD>
```

P2

FIG. 7B

HIDDEN REPLACEABLE MEDIA SLOTS

CROSS REFERENCE TO RELATED APPLICATIONS

The present application is a continuation of U.S. application Ser. No. 14/810,004, filed Jul. 27, 2015, the entire contents and disclosure of which are incorporated by reference herein.

BACKGROUND OF THE INVENTION

Field of the Invention

Embodiments described herein relate generally to a method, non-transitory computer-readable storage medium, and reception apparatus for determining hidden replaceable media slots; a method, non-transitory computer-readable storage medium, and an information providing apparatus for signaling the hidden replaceable media slots; and a method and non-transitory computer-readable storage medium for determining additional period information for the hidden replaceable media slots.

Background

Modern television receivers are capable of performing numerous processes to enhance the presentation of television content. These processes include replacing predetermined portions of content (e.g., advertisements) with content targeted specifically to the interests or demographics of the viewer. Broadcasters often wish to obscure the exact location in time of these predetermined periods to avoid the possibility of unauthorized replacement with different content, or enabling easy "ad skipping" in a personal video recorder (PVR) device. However, in order to replace these predetermined portions of content, the television receiver must be able to identify the portion of the content that is to be replaced.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present disclosure. The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY OF THE INVENTION

According to an embodiment of the present disclosure, there is provided a method of a reception apparatus for determining a hidden replaceable period of a MP (Media Presentation), the method includes receiving, by circuitry of the reception apparatus, a first MPD (Media Presentation Description). The first MPD identifies a predetermined period and at least one media segment of the MP to be presented during the predetermined period. A determination is made as to whether the first MPD includes additional data to be resolved by an application. The additional data is provided, by the circuitry, to the application when the first MPD is determined to include the additional data. Additional period information is received from the application. The additional period information is determined by the application based on the additional data and identifies a replaceable sub-period within the predetermined period. A second MPD is generated by the circuitry based on the received additional period information. Further, the method includes outputting, by the circuitry, the MP for display to a user based on the second MPD. Each of a subset of the at least one media segment for the replaceable sub-period of the MP is replaceable with an alternate media segment.

Further, according to an embodiment of the present disclosure, there is provided a non-transitory computer-readable medium storing instructions which when executed by a computer causes the computer to perform the method for determining the hidden replaceable period, as described above.

Further, according to an embodiment of the present disclosure, there is provided a reception apparatus, including circuitry configured to receive a first MPD. The first MPD identifies a predetermined period and at least one media segment of a MP to be presented during the predetermined period. The circuitry is configured to determine whether the first MPD includes additional data to be resolved by an application, provide the additional data to the application when the first MPD is determined to include the additional data, and receive additional period information from the application. The additional period information is determined by the application based on the additional data and identifies a replaceable sub-period within the predetermined period. The circuitry is further configured to generate a second MPD based on the received additional period information, and output the MP for display to a user based on the second MPD. Each of a subset of the at least one media segment for the replaceable sub-period of the MP is replaceable with an alternate media segment.

Further, according to an embodiment of the present disclosure, there is provided a method of an information providing apparatus for signaling a hidden replaceable period of a MP, the method includes generating, by circuitry of an information providing apparatus, a first MPD that identifies a predetermined period and at least one media segment of the MP to be presented during the predetermined period. The first MPD includes additional data to be resolved by an application executed on a reception apparatus to determine additional period information identifying a replaceable sub-period within the predetermined period. The method further includes transmitting, by the circuitry, the first MPD and the at least one media segment of the MP to the reception apparatus, in which the reception apparatus outputs the MP for display to a user based on a second MPD generated based on the determined additional period information. Each of a subset of the at least one media segment for the replaceable sub-period of the MP is replaceable with an alternate media segment.

Further, according to an embodiment of the present disclosure, there is provided a non-transitory computer-readable medium storing instructions which when executed by a computer causes the computer to perform the method for signaling the hidden replaceable period, as described above.

Further, according to an embodiment of the present disclosure, there is provided an information providing apparatus, including circuitry configured to generate a first MPD that identifies a predetermined period and at least one media segment of a MP to be presented during the predetermined period. The first MPD includes additional data to be resolved by an application executed on a reception apparatus to determine additional period information identifying a replaceable sub-period within the predetermined period. The circuitry is further configured to transmit the first MPD and the at least one media segment of the MP to the reception apparatus. The reception apparatus outputs the MP for display to a user based on a second MPD generated based on the determined additional period information. Each of a subset of the at least one media segment for the replaceable sub-period of the MP is replaceable with an alternate media segment.

Further, according to an embodiment of the present disclosure, there is provided a non-transitory computer-readable medium storing instructions which when executed by a computer causes the computer to perform a method of an application for determining additional period information for a hidden replaceable period of a MP, the method includes receiving additional data to be resolved by the application and extracted from a first MPD (Media Presentation Description). The first MPD identifies a predetermined period and at least one media segment of the MP to be presented during the predetermined period. The additional period information is generated based on the received additional data. The additional period information identifies a replaceable sub-period within the predetermined period. The method further includes outputting the generated additional period information for generation of a second MPD.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 2A is a block diagram of an exemplary reception apparatus;

FIG. 2B is a processor-centric block diagram of an exemplary reception apparatus;

FIG. 5A illustrates an exemplary MPD (Media Presentation Description);

FIG. 5B illustrates an exemplary format of a public MPD;

FIG. 7A illustrates an exemplary format of a private MPD;

FIG. 7B illustrates an exemplary format of another private MPD;

DETAILED DESCRIPTION

Figure 1:
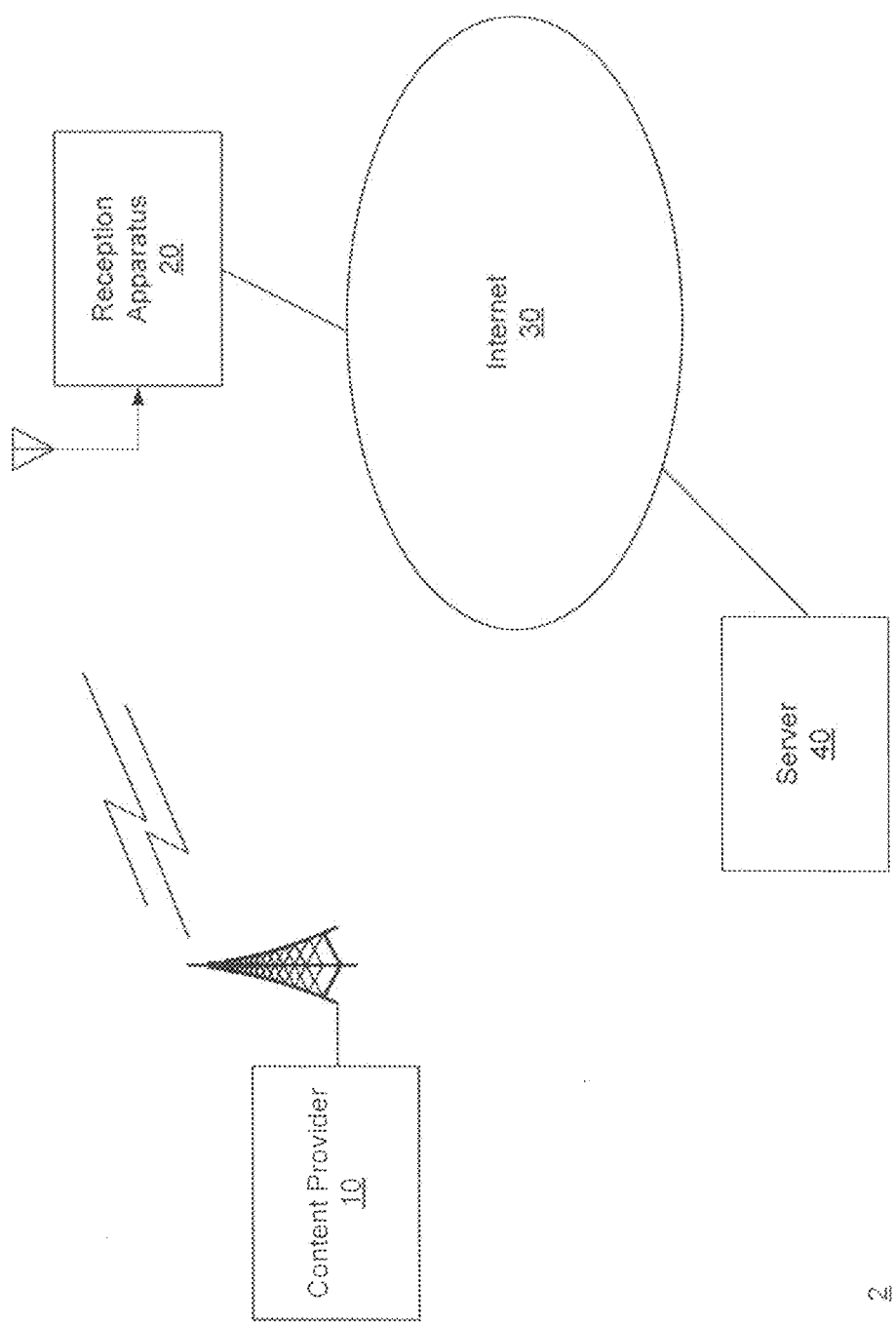
FIG. 1 illustrates an exemplary broadcast system.

While the present disclosure is susceptible of embodiment in many different forms, there is shown in the drawings and will herein be described in detail specific embodiments, with the understanding that the present disclosure of such embodiments is to be considered as an example of the principles and not intended to limit the present disclosure to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio/video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an EPG.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Embodiments of the present disclosure are directed to signaling one or more hidden periods, which include at least one replaceable media slot, in a MP (Media Presentation), to one or more reception apparatuses. Further, embodiments of the present disclosure are directed to restricting identification of the replaceable media slots to prevent, for example, unauthorized usage by unauthorized applications for content replacement or skipping of certain content (e.g., skipping advertisements during playback of recorded content).

Referring now to the drawings, FIG. 1 is a block diagram that shows an exemplary broadcast system 2, including a content provider 10, a reception apparatus 20, and one or more servers 40. The reception apparatus 20 accesses the one or more servers 40 via one or more communication networks such as the Internet 30.

The content provider 10, which may be a broadcaster or other service provider, provides content for the MP and an MPD (Media Presentation Description) to the reception apparatus 20. The MP is a time bounded or unbounded presentation of media content (e.g., audio and/or video content). The MP is made up of one or more media segments that are identified in the MPD. An embodiment of the data structure and semantics of the MPD is defined in ISO/IEC 23009-1-1:2014, "Information technology—Dynamic adaptive streaming over HTTP (DASH)—Part 1: Media presentation description and segment formats," International Organization for Standardization, 2nd Edition, May 15, 2014, which is incorporated herein by reference in its entirety.

The MPD provides the resource identifiers for individual media components of a linear/streaming service in the form of Segment URLs, and the context of the identified resource within the MP. Further, although embodiments of the present disclosure are described using an MPD that covers a 24 hr period, any other period of time may be covered by the MPD in other embodiments.

In certain embodiments, the MP is presented according to a media timeline that is described by two types of MPDs, a public MPD and a private MPD. The public MPD does not identify a replaceable period (e.g., available advertisement slots) while the private MPD does identify the replaceable period and is hidden in such a manner that identification of the replaceable period is restricted, for example to a broadcaster-provided application or other authorized applications.

The private MPD may be delivered in an encrypted format. Further, in certain embodiments, additional data necessary to derive the private MPD from the public MPD is provided by the content provider 10 to the reception apparatus 20. For example, the additional data necessary to derive the private MPD may be included in the public MPD and tagged with an XLink, as further described below.

Only certain authorized applications (e.g., a broadcaster-provided application) can decrypt the private MPD or interpret the information necessary to derive the private MPD from the public MPD. For example, only a broadcaster-provided application may have the keys necessary to decrypt an encrypted MPD or information encrypted in the Public MPD. In another embodiment, only certain authorized applications are enabled to interpret the additional data or access a broadcaster server to interpret the additional data.

The content provider 10 provides content to the reception apparatus 20 via a terrestrial broadcast according to one embodiment. In other embodiments, the content provider 10 provides the content via at least one of a satellite broadcast, a cable television transmission, the terrestrial television broadcast, cellular network, and data communication network such as a local area network (LAN), wide area network (WAN), or the Internet 30. The content provided by the content provider 10 includes one or more television programs, without regard to whether the content is a movie, sporting event, segment of a multi-part series, news broadcast, etc. Further, the content provided by the content provider 10 may also include advertisements, infomercials, and other program-like content which may not be reported as a program in an EPG. The content provider 10 may also provide content that contains only audio or only video.

The reception apparatus 20 receives the content provided by the content provider 10 and displays the content on a display (e.g., a liquid crystal or organic light-emitting diode display), for example the display 350 illustrated in FIG. 2B.

The display 350 may be an integral part of the reception apparatus 20 such as a television set. Alternatively, the display 350 may be external to the reception apparatus 20 such as a television set connected to a set top box. In one embodiment, the application is provided within a broadcast stream (e.g., a terrestrial broadcast signal) as "adjunct data" alongside the audio/video data. The reception apparatus 20 downloads the application directly from the broadcast stream received on the tuned broadcast channel.

The one or more servers 40, in certain embodiments, provide the application used to derive the private MPD and/or interpret the additional data for determining one or more replaceable periods. For example, when the reception apparatus 20 tunes to a broadcast channel of the content provider 10, the reception apparatus 20 may download the application from the one or more servers 40. Further, in certain embodiments, the application queries the one or more servers 40 for information necessary for the private MPD to be generated.

FIG. 2A illustrates an embodiment of the reception apparatus 20. The reception apparatus 20 may be implemented in or connected to a fixed device such as a television set or desktop computer, or a mobile device such as a device on a vehicle, a portable computer, smart phone, tablet, etc. In certain embodiments, the reception apparatus 20 is a digital television receiver device that may be incorporated into a television set or a set top box connected to the television set.

The reception apparatus 20 includes a tuner/demodulator 202, which receives content from one or more content providers via a terrestrial broadcast or a cable television transmission. The reception apparatus 20 may also, or alternatively, receive content from a satellite broadcast. The tuner/demodulator 202 receives a packet stream (PS) such as a transport stream (TS) or IP packet stream, which is demultiplexed by the demultiplexer 206 into audio and video (A/V) streams. Exemplary IP packet streams are described in the ATSC Mobile DTV standard ATSC-M/H (A/153) and the Enhanced Multicast Multimedia Broadcast (eMBMS) standard 3GPP: TS 26.346 V12.4.0 (2014-12), "3rd Generation Partnership Project; Technical Specification Group Services and System Aspects; Multimedia Broadcast/Multicast Service (MBMS); Protocols and codecs (Release 12), which are incorporated herein by reference in their entirety. The audio is decoded by an audio decoder 210 and the video is decoded by a video decoder 214.

Further, uncompressed A/V data may be received via an uncompressed A/V interface (e.g., a HDMI interface) that can be selectively utilized. The uncompressed A/V data may be received from a set-top box, digital video recorder, DVD player, or any other consumer electronics device connected to the reception apparatus 20 via the uncompressed A/V interface. In certain embodiments, the uncompressed A/V data has audio/video watermarks embedded therein. The watermarks are used to provide timing and linkages to a public MPD associated with the uncompressed A/V data. The video watermarks may be embedded in a manner similar to the metadata in U.S. application Ser. No. 14/741,168, which is incorporated herein by reference in its entirety.

In addition to content, the TS or IP packet stream may include caption data, alternate content (e.g., alternate advertisements), one or more MPDS, broadcast and/or other applications, metadata, etc. One or more of the content, the caption data, the alternate content, the one or more MPDS, the broadcast and/or other applications, metadata, etc. may also be receivable via the Internet 30 and a network interface 226. In certain embodiments, the caption data, or other metadata is embedded, or otherwise inserted, in an audio and/or video portion of the content. A CPU 238 extracts the embedded information from the audio and/or video portions of the content and performs one or more processes based on the extracted information.

According to one embodiment, the reception apparatus 20 includes an embedded media player for processing the content of the MP for display to a user of the reception apparatus 20 based on the MPD received from the content provider 10 at least one parameter provided by the broadcaster-provided application, as further described below. The CPU 238 executes the embedded media player that presents the content based on the MPD and/or the broadcaster-provided application.

A storage unit 230 is provided to store the alternate content or other recorded content. The alternate or stored content can be played by demultiplexing the content stored in the storage unit 230 by the demultiplexer 206 in a manner similar to that of other sources of content. The storage unit 230 may also store the broadcaster-provided application in certain embodiments. In one embodiment, a different broadcaster-provided application is stored for each content provider 10.

The reception apparatus 20 generally operates under control of at least one processor, such as the CPU 238, which is coupled to a working memory 240, program memory 242, and a graphics subsystem 244 via one or more buses (e.g., bus 250). The CPU 238 receives closed caption data from the demultiplexer 206 as well as any other information such as EPGs used for rendering graphics, and passes the information to the graphics subsystem 244. Graphics outputted by the graphics subsystem 244 are combined with video images by the compositor and video interface 260 to produce an output suitable for display on a video display.

Further, the CPU 238 operates to cry out functions of the reception apparatus 20 including, for example, one or a combination of the execution of the broadcaster-provided application, execution and/or control of the embedded media player, processing of the MPD, determining one or more hidden replaceable periods, processing of metadata, etc.

Although not illustrated in FIG. 2A, the CPU 238 may be coupled to any one or a combination of the reception apparatus 20 resources to centralize control of one or more functions. In one embodiment, the CPU 238 also operates to oversee control of the reception apparatus 20 including the tuner/demodulator 202 and other television resources.

A more processor-centric view of the reception apparatus 20 is illustrated in FIG. 2B. Memory and storage 230, 240, and 242 are depicted collectively as memory 310. Further, a processor 300 includes one or more processing units such as CPU 238. Similarly, the various demodulators, decoders, etc., that initially process digital television signals are collectively depicted as television receiver/tuner 320. The reception apparatus 20 further includes a remote controller 360 which communicates with a remote controller receiver interface 340. Additionally, the display 350 is connected to a display interface 330, which includes for example the uncompressed A/V interface and/or compositor 260, and is either a display integral to the reception apparatus 20 as in a television set or a connected display device as in the case where the reception apparatus 20 is integrated into a set-top box.

Memory 310 contains various functional program modules and data. The memory 310 stores the data used by the reception apparatus 20. The memory 310 within the reception apparatus 20 can be implemented using disc storage form as well as other forms of storage such as non-transitory storage devices including for example network memory devices, magnetic storage elements, magneto-optical storage elements, flash memory, core memory and/or other non-volatile storage technologies. The term "non-transitory" is a limitation of the medium itself (i.e., tangible, not a signal) as opposed to a limitation on data storage persistency (e.g., RAM vs. ROM).

When a broadcaster-provided application 316 is received, the broadcaster-provided application 316 is stored in the memory 310. The broadcaster-provided application 316 is executed by the processor 300, for example, in response to a request from the embedded media player 312. Further, the broadcaster-provided application 316 may cause the processor 300 to control the reception apparatus 20 to acquire alternate content 318, which is stored in the memory 310 for subsequent retrieval. In another embodiment, the processor 300 causes the reception apparatus 20 to retrieve or stream the alternate content 318 at the time of presentation.

Figure 3:
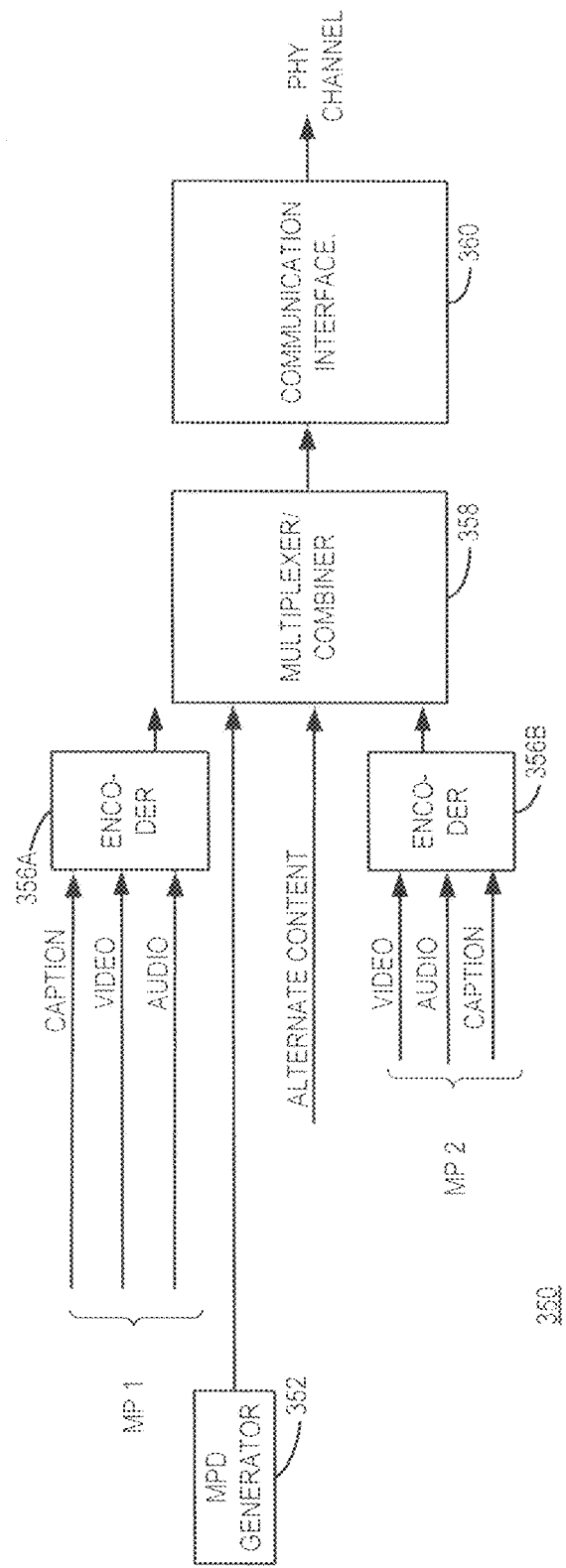
FIG. 3 illustrates an exemplary information providing apparatus.

FIG. 3 is a basic diagram of an exemplary information providing apparatus 350, which for example is utilized by the content provider 10. Generally speaking, a single content provider may provide multiple programs (e.g., plural MPs) over one or more transport streams or IP packet streams. For example, audio, video, and caption data for one MP 1 are provided to an encoder 356A while audio, video, and caption data for MP 2 are provided to an encoder 356B. A transport stream multiplexer/combiner 358 receives the outputs from the encoders 356A, 356B, the MPD from an MPD generator 352, and an alternate content stream, and provides an output that can be distributed via a physical channel medium such as a terrestrial, cable, or satellite broadcast. A communication interface 360 (e.g., a broadcast transmitter) distributes the output from the transport stream multiplexer/combiner 358 via the physical channel medium.

The MPD generator 352 generates an MPD including a DASH Period covering a period of a MP in which one or more replaceable sub-periods may be hidden, as further described below. Further, one or more alternate content streams may provide alternate content (e.g., alternate advertisements) in real-time and/or non-real-time (NRT). Real-time alternate content that is included in the broadcast stream could be transmitted as MP 3, in a manner similar to MP 1 and MP 2. In this case, the reception apparatus 20 may switch between MP 1 and MP 3, for example, when replacing content in one or more replaceable sub-periods. NRT alternate content may be included within the broadcast stream as described in ATSC A/103:2014, Jul. 25, 2014, which is incorporated herein by reference in its entirety. Further, in certain embodiments, the NRT alternate content may be obtained from a broadband server (e.g., a broadcaster server) and pre-cached and/or streamed on demand.

As described in further detail below, certain embodiments of the present disclosure are directed to signaling one or more replaceable periods (or media slots) by identifying a replaceable DASH Period in an MPD. Each DASH Period that has one or more replaceable portions is tagged with an XLink. An embedded media player of the reception apparatus 20 calls on a broadcaster-provided application, or other authorized application, to resolve each XLink. The resolution of the XLink involves the derivation of a new DASH Period or Periods to replace the one that had contained the XLink.

Figure 4:
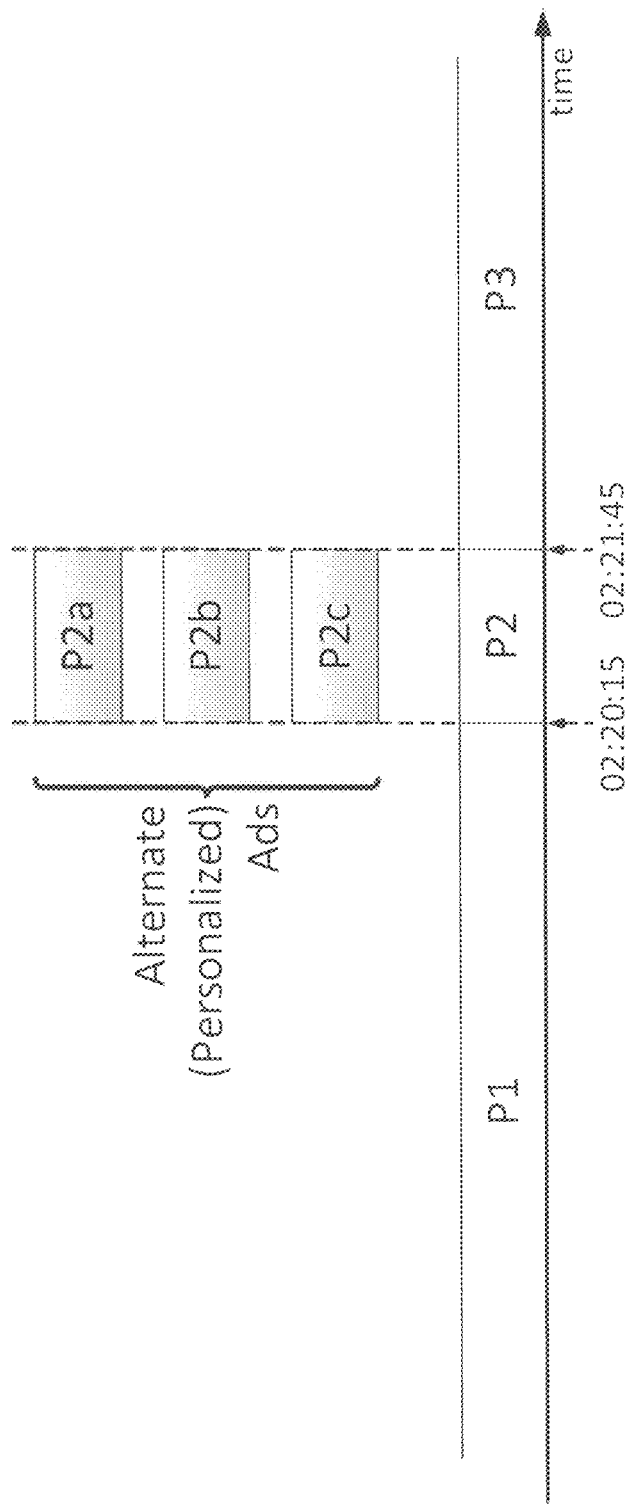
FIG. 4 illustrates exemplary MP (Media Presentation) including a plurality of different periods.

FIG. 4 illustrates an exemplary media timeline for a MP that includes three DASH Periods P1, P2, P3. P2 is a replaceable Period that represents one or more replaceable media slots and can be replaced by alternate Periods P2a, P2b, P2c. P2 is also the default replaceable Period if no alternate Periods are selected. In one embodiment, the alternate Periods P2a, P2b, P2c are Period elements for displaying alternate content (e.g., personalized advertisements). Although embodiments of the present disclosure are described using replaceable advertisements as examples, other types of replaceable content (e.g., news or weather segments such as local news or weather specific to a geographic region of a user of the reception apparatus 20) can be provided in the replaceable period.

FIG. 5A illustrates an exemplary MPD 502 according to one embodiment. The MPD 502 is a public MPD that is accessible to any application running on the reception apparatus 20 and includes a single predetermined DASH Period 504, which includes the Periods P1, P2, P3 illustrated in FIG. 4. The Periods P1, P2, P3 can be referred to as sub-periods of the predetermined Period 504 in this example. Although the location of the sub-periods are known to the broadcaster, the only DASH Period identified in the public MPD is Period 504, which by itself covers the full period of time of sub periods P1, P2, and P3, without identifying the locations of each sub-period within. Further, the MPD 502 includes additional data that can be used to determine the location and duration in time of replaceable sub-period P2. As illustrated in FIG. 5A, the additional data is associated with the predetermined Period 504 from which a private MPD identifying the sub-periods P1, P2, P3 can be derived.

FIG. 5B illustrates a portion of an exemplary public MPD. In this example, a broadcaster operates with a DASH Period duration of one day and the Period starts at midnight Coordinated Universal Time (UTC). DASH Media Segments occur at once per a second and are numbered 1 to 86,400 to cover one full days' time. Further, a thirty second available advertisement slot occurs at 9:00:00 UTC. As illustrated in FIG. 5B, the public MPD includes a single Period (starting at zero seconds, which is defined by Period start="PT0S"). The single Period includes an XLink referencing additional data to be resolved by an application (e.g., a broadcaster-provided application).

In FIG. 5B, the duration PT1D is optional and indicates that the duration of the Period starting at PT0S is one day. The filename "xbc-$Number$.mp4v" identifies the DASH Media Segments corresponding to the one second segments. A sequence number corresponding to "$Number$" is set to one by default and is incremented by one for each of the one second segments. The filename of the first Media Segment of the day would be "xbc-1.mp4v." The filename of the last Media Segment of the day would be "xbc-86400.mp4v." The Representation element defines parameters such as video resolution, video component characteristics, audio, captions, etc. Further, a ratio of the duration and time scale parameter defines the number of seconds per a segment, which in this case is one. The timescale and duration can be set to other values such as 1 in other embodiments. Further, availability start time identifies the date and time corresponding to the MPD.

The XLink includes additional data that the application uses to identify a thirty second available advertisement slot, corresponding to a replaceable sub-period of a DASH Period, that is hidden in the public MPD by the broadcaster. As illustrated in FIG. 5B, the additional data in the XLink includes the string "4A92D344092A9A09eC35," which may correspond to encrypted segment ranges or an identifier to be processed by the application. In one embodiment, the embedded media player of the reception apparatus 20 passes this string to the application, which decrypts the string and returns the segment ranges as additional period information (e.g., in the form of a new Period element) to the reception apparatus 20. In another embodiment, the application determines the segment ranges based on the identifier. The segment ranges are parameters that are used by the reception apparatus 20 to generate a private MPD, which includes the hidden replaceable sub-period.

Figure 6:
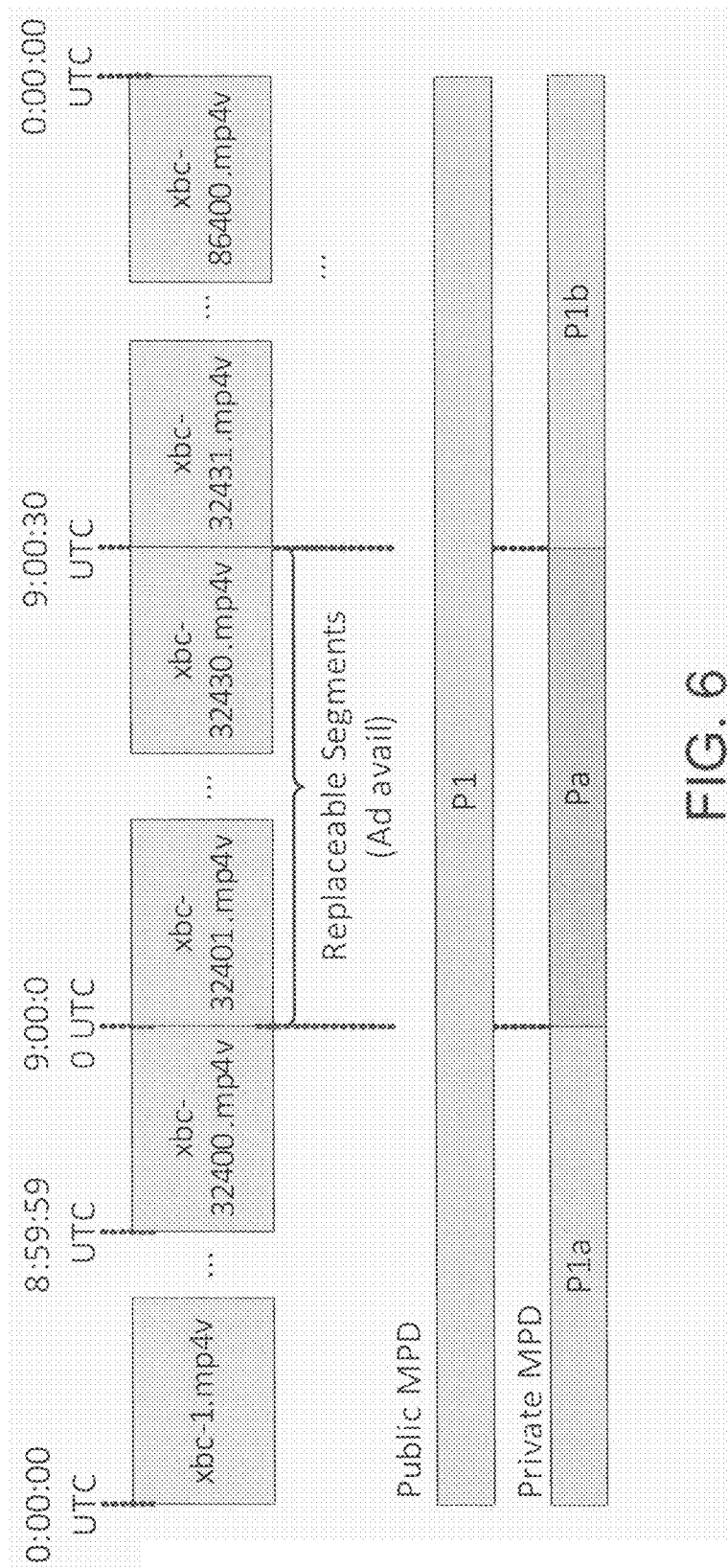
FIG. 6 illustrates an exemplary comparison between public and private MPDs.

FIG. 6 illustrates exemplary comparison between public and private MPDs. As illustrated in FIG. 6, each Period of the public and private MPDs is associated with at least one media segment (e.g., xbc-1.mp4v). The public and private MPDs identify a same subset of Media Segments (e.g., xbc-1.mp4v to xbc-32400.mp4v and xbc-32431.mp4v to xbc-86400.mp4v). However, one or more of a second subset of Media Segments in the public MPD (e.g., xbc-32401.mp4v to xbc-32430.mp4v) may be replaced by an alternate Media Segment in the private MPD.

FIGS. 7A and 7B illustrate exemplary private MPDs that can be derived from the public MPD 502, illustrated in FIG. 5A, according to certain embodiments of the present disclosure. FIGS. 7A and 7B differ by the Media Segments identified for the replaceable sub-period P2. In FIG. 74, the replaceable sub-period P2 identifies the same Media Segments that were identified in the public MPD. That is, both the public and private MPDs point to the same set of DASH Media Segments (for the default media segment case). However, one or more sets of Media Segments in the Private MPD is actually replaceable. As described above, in certain embodiments, the private MPD may be created from the public MPD using additional data signaled to the reception apparatus 20 in the public MPD. The additional data may optionally be encrypted for security.

As illustrated in FIG. 7A, the private MPD includes a first sub-period of the public MPD Period starting at PT0S in the public MPD. However the period duration and XLink are omitted. The private MPD further includes the replaceable sub-period P2 of the public MPD Period starting at PT9H (i.e., 9:00:00 UTC). The replaceable sub-period P2 is determined based on the segment ranges decrypted from the additional data in the public MPD according to one embodiment. For example, the segment ranges identify the start numbers 32401 and 32431. The start number 32401 indicates the start point of the replaceable sub-period while the start number 32431 indicates the point at which a non-replaceable portion of the MP resumes. However, any other parameters in the private MPD such as the sub-period start times and/or media segment identifiers may be identified by the application.

In FIG. 7B, the replaceable sub-period P2 identifies alternate Media Segments that replace the Media Segments identified in the public MPD for that sub-period. The alternate Media Segments are selected by the application based on a user preference and/or profile according to one embodiment. However, in other embodiments, the alternate Media Segments may be selected by another application such as a media player or executed on another device (e.g., the one or more servers 40). The replaceable sub-period P2 may identify a predetermined filename or other identifier that indicates that the file is replaceable by the other application, and access to this information may be controlled by the broadcaster (e.g., by identifying other authorized applications).

In certain embodiments, the knowledge needed to decrypt or otherwise identify the location of the replaceable sub-period must lie with the broadcaster, for example either downloaded in a broadcaster-provided application downloaded to the reception apparatus 20, broadcaster-provided media player, or in a broadcaster server. In one embodiment, the alternate Media Segments are selected by the broadcaster server, which may be connected to the reception apparatus 20 via the Internet. The reception apparatus 20 passes an XLink along with some information relative to personalization parameters to the broadcaster server. The XLink may be provided by the reception apparatus 20 using a broadcaster-provided application or using a built-in function of the reception apparatus 20, in which case the location of the broadcaster server is identified in the XLink in one embodiment. The broadcaster server decrypts or otherwise processes (e.g., using a lookup table) the XLink and returns Periods with pointers to alternate content (e.g., the advertisement replacement content).

In one example, if a broadcaster wishes to target advertisements to people on the East or West side of town. The reception apparatus 20 knows its location as either East (zone=1) or West (zone=2) side. The XLink could have a parameter, such as "?zone=1" or "?zone=2", added to it by the reception apparatus 20. Then the broadcaster server would return in the replaceable Period a pointer to alternate content appropriate to that region or zone.

Figure 8:
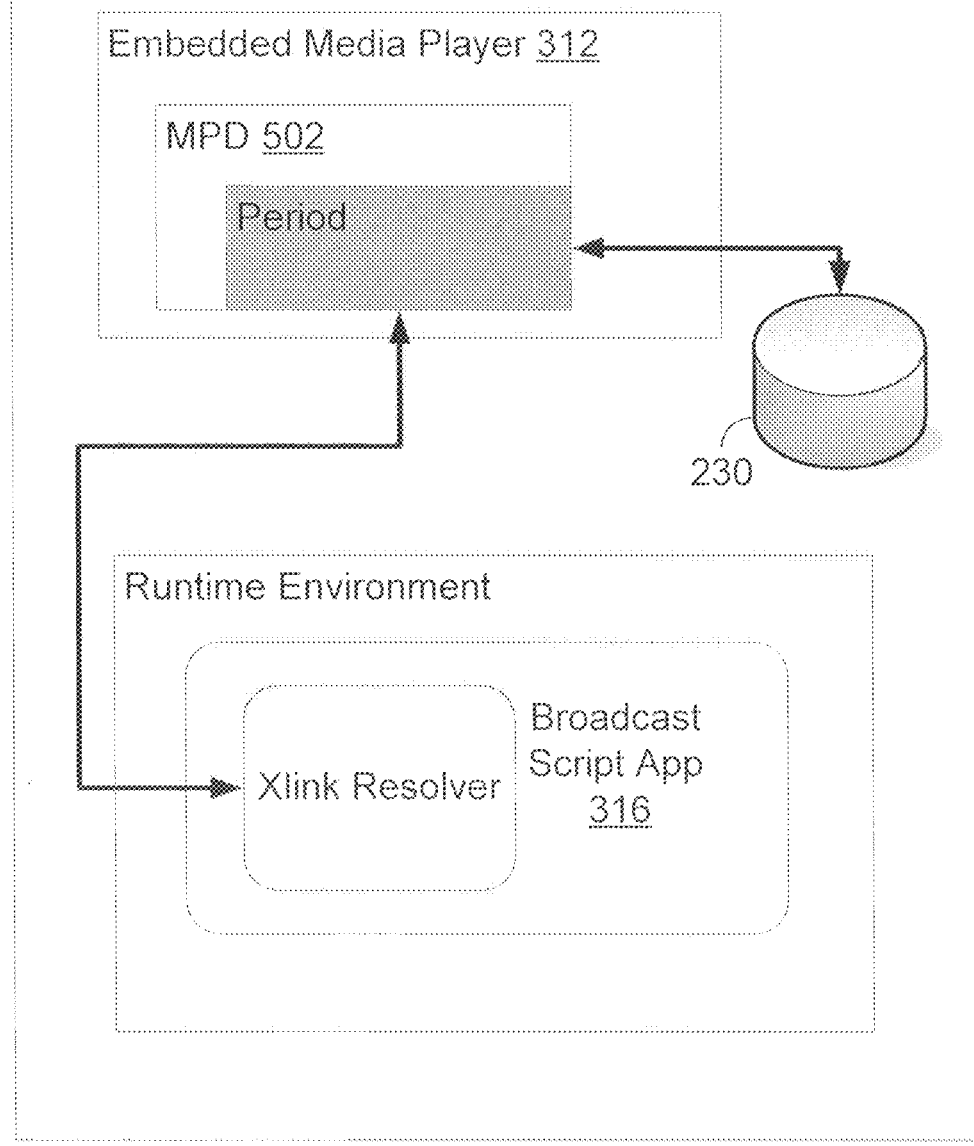
FIG. 8 illustrates the relationship between different functional components of a reception apparatus according to one embodiment.

FIG. 8 illustrates functional components of the reception apparatus 20 according to one embodiment. As illustrated in FIG. 8, the reception apparatus 20 includes the embedded media player 312 which processes the MPD 502 to output a MP for display to a user. The embedded media player 312 communicates with a broadcaster-provided application 316 to resolve additional data tagged in an XLink in the MPD 502.

In certain embodiments, the broadcaster-provided application 316 is executed by a browser and can be referred to as a Script Application, which does not use any capabilities of the browser for displaying any content. For example, the application does not provide output of any kind for display (e.g., HTML5 output of text, graphics, video, tables, etc.). An underpowered reception apparatus 20 could then be configured to only play Script Applications, while still being capable of performing media slot (e.g., advertisement slot) replacements because it can resolve XLinks.

Further, in one embodiment, the embedded media player 312 communicates with storage 230 to acquire alternate content that may be identified by the broadcaster-provided application 316. Further, the embedded media player 312 may instruct the reception apparatus 20 to precache the alternate content in the storage 230 based on the private MPD or response from the application in certain embodiments. In another embodiment, the broadcaster-provided application 316 causes the reception apparatus 20 to download the alternate content.

Figure 9:
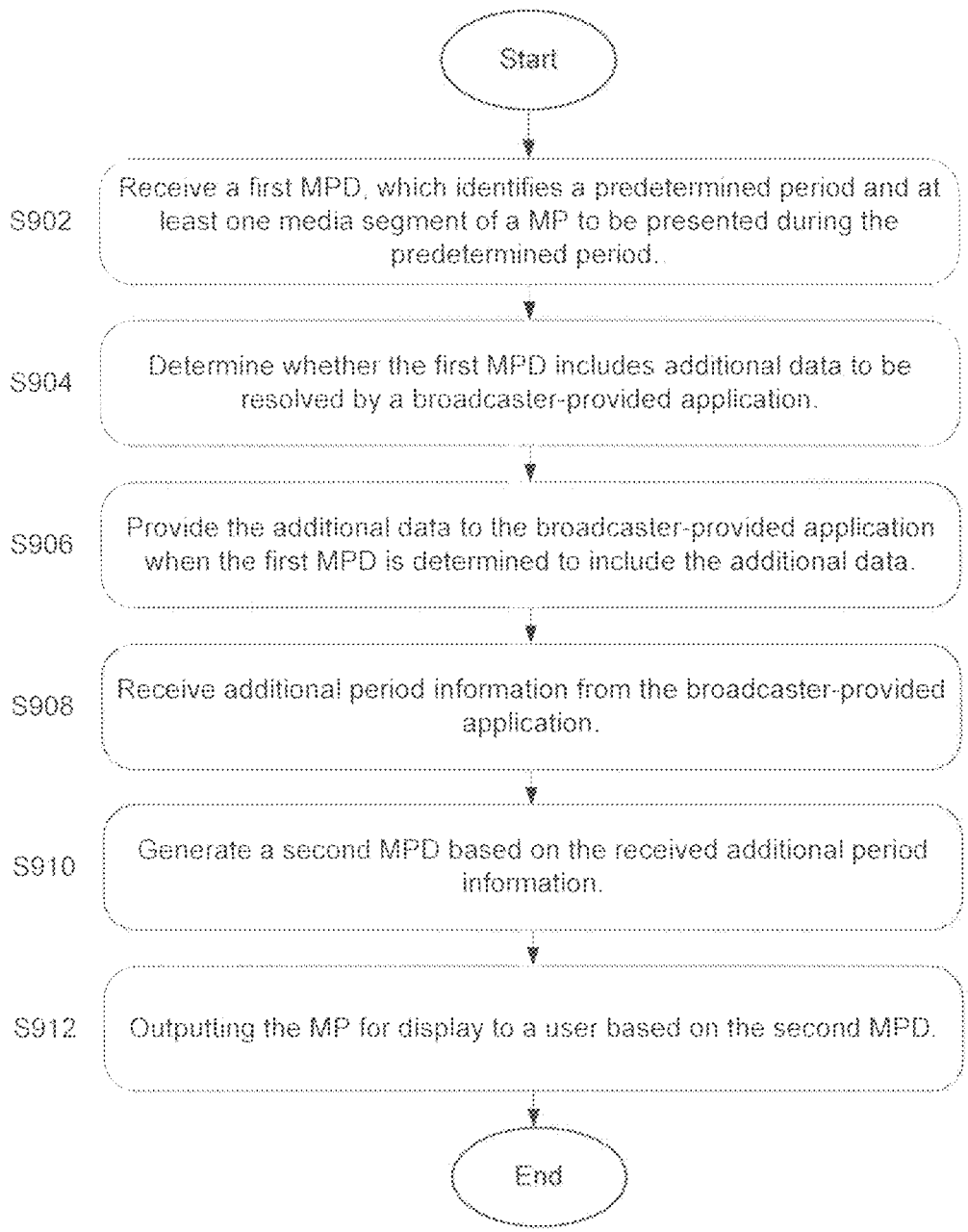
FIG. 9 illustrates a method for determining a hidden replaceable period of a MP according to one embodiment.

FIG. 9 provides an overview of an exemplary method of the reception apparatus 20 for determining a hidden replaceable period of a MP. In step S902, the reception apparatus 20 receives a first MPD (e.g., a public MPD), which identifies a predetermined period and at least one media segment of the MP to be presented during the predetermined period. For example, the reception apparatus 20 receives the public MPD, including the DASH Period 504 described with reference to FIGS. 5A-5B via circuitry of the reception apparatus 20, such as the tuner/demodulator 202 and demultiplexer 206.

In step S904, the reception apparatus 20 determines Whether the first MPD includes additional data that is to be resolved by a broadcaster-provided, or other authorized (e.g., advertiser), application. For example, the embedded media player 312 of the reception apparatus 20 determines whether the public MPD includes additional data based on whether the DASH Period 504 of the public MPD is tagged with an XLink.

In step S906, the reception apparatus 20 provides the additional data to the broadcaster-provided, or other authorized, application. The application processes the additional data and determines additional period information for identifying the hidden replaceable sub-period based on the additional data, as further described below with respect to FIG. 10. In step S908, the media player of the reception apparatus 20 receives the additional period information from the application. In one embodiment, the additional period information includes one or more Period elements that replace the Period element (e.g., the DASH Period 504) containing the XLink. For example, the additional period information may include a Period element for the sub-period P2 and one or more of the sub-periods starting at PT0S and PT9H0M30S, as illustrated in FIG. 7A or 7B.

The reception apparatus 20 generates a second MPD (e.g., private MPD) based on the received additional period information in step S910. For example, the additional period information received from the application are one or more DASH Period elements including, for example, the Period P2 illustrated in FIG. 7B, that the embedded media player 312 uses to replace the Period element in the first MPD received in step S902. In another example, the embedded media player 312 determines the Period P2 based on the startNumber value of 32401 and/or the period start value of PT9H which are received from the application. The media player further determines the sub-period starting at PT9H0M30S, following the replaceable sub-period in one embodiment. However, the determination of such a sub-period is not required when the replaceable sub-period extends to the end of the predetermined period. The additional period information is used to generate the private MPD illustrated in FIG. 7B. Through the XLink resolution process the public MPD may be effectively edited by the broadcaster-provided application, the embedded media player 312, or another component of the reception apparatus 20 to generate the private MPD.

In step S912, the reception apparatus 20 (e.g., the embedded media player of the reception apparatus) outputs the MP for display to a user based on the second MPD. Each of a subset of the at least one media segment for the replaceable sub-period of the MP is replaceable with an alternate media segment. For example, the private MPD is processed by the embedded media player 312 to present alternate media segments (e.g., alternate advertisements) to the user. The alternate Media Segments are identified in the private MPD according to one embodiment.

Figure 10:
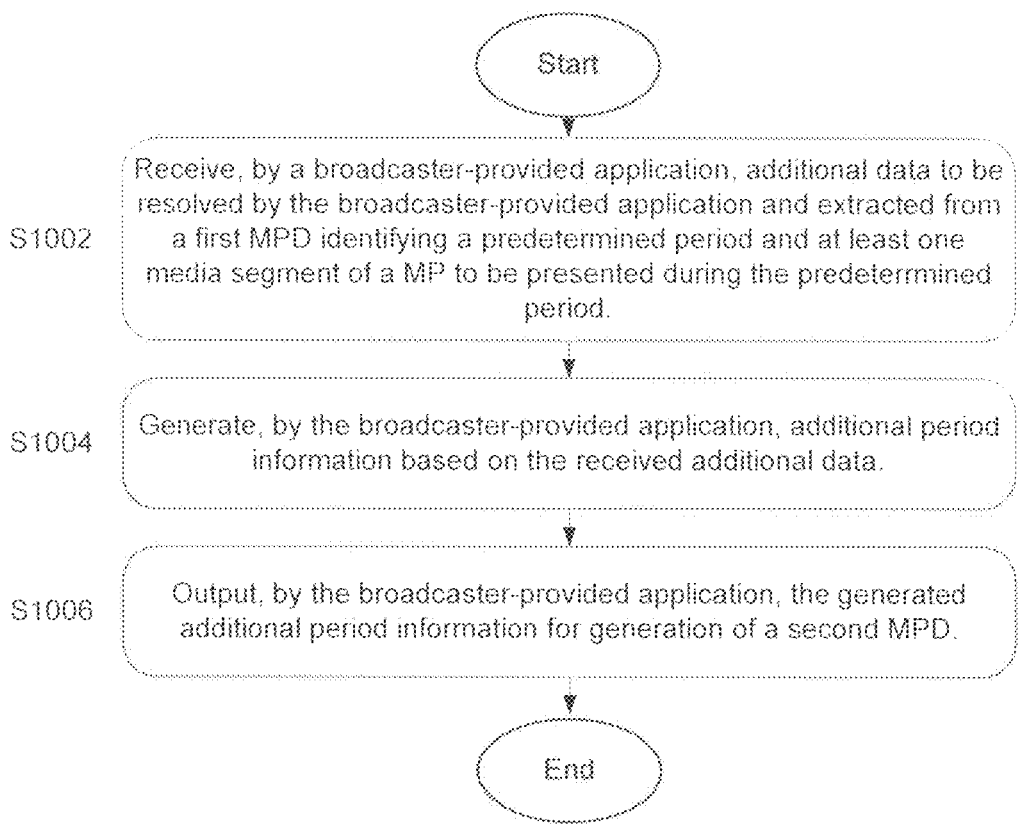
FIG. 10 illustrates a method of a broadcaster-provided application for determining additional period information for the hidden replaceable period of the MP according to one embodiment.

FIG. 10 provides an overview of an exemplary method of a broadcaster-provided, or other authorized, application for determining additional period information for a hidden replaceable period of a MP according to certain embodiments. In order to resolve the XLink, the broadcaster-provided application (e.g., an HTML5 page containing at minimum, JavaScript to perform the XLink resolution) arrives at the reception apparatus 20 and begins to execute. The broadcaster-provided application may be downloaded by the reception apparatus 20 from a digital television signal or a separate source such as a server (e.g., the one or more servers 40) via the Internet. In certain embodiments, the broadcaster-provided application is programmed to perform an advertisement selection operation by considering the user's personal information and any prior service usage information. The broadcaster-provided application registers itself in the reception apparatus 20 such that it is notified of any XLinks in an MPD that need resolution. Further, in one embodiment, the broadcaster-provided application may be programmed to request that certain item(s) of alternate content (e.g., alternate advertisement content) be retrieved and cached by the reception apparatus 20.

In one embodiment, broadcaster-provided applications are responsible for pre-caching candidate alternate content (e.g., alternate advertisements). The alternate content may be delivered via broadcast or a broadband path. Further, the broadcaster-provided applications can be updated at any time through normal broadcast file delivery, for example over FLUTE (File Delivery over Unidirectional Transport), as defined in RFC 6726, which is incorporated by reference in its entirety. Further, in certain embodiments, the broadcaster-provided application can use a broadcaster's server to help resolve the XLink.

In step S1002, the application receives additional data to be resolved by the broadcaster-provided application. The additional data is extracted from a first MPD (e.g., public MPD) that identifies a predetermined period (e.g., as defined by a DASH Period element) and at least one Media Segment of the MP. For example, the application receives the additional data included in the public MPD illustrated in FIG. 5B, In step S1004, the broadcaster-provided application generates the additional period information based on the received additional data. The additional period information identifies the replaceable sub-period within the predetermined period. For example, the broadcaster-provided application generates one or more DASH Period elements that replace the DASH Period element in the public MPD. In another example, the broadcaster-provided application generates the start numbers 32401 and 32431 of the private MPD illustrated in FIG. 7B. In this case, the reception apparatus 20 (e.g., using the embedded media player or another application) may generate the one or more DASH Period elements. However, other parameters of the private MPD may be generated.

The application may be programmed to generate the additional period information by decrypting at least one parameter from the additional data and/or using the additional data as an identifier to look up, or otherwise determine, the at least one parameter included in the additional period information. In one embodiment, when the additional data contains an identifier, the broadcaster-provided application refers to an internal look up table to determine the at least one parameter corresponding to the identifier. In another embodiment, the broadcaster-provided application provides the identifier to a predetermined server, for example that is predefined in the broadcaster-provided application or the additional data, to acquire the at least one parameter or the one or more replacement DASH Period elements. The broadcaster-provided application may then generate the one or more DASH Period elements based on the at least one parameter.

In step S1006, the broadcaster-provided application outputs the generated additional period information for generation of a second MPD (e.g., a private MPD). The additional period information may be output to the media player or other component of the reception apparatus 20 for derivation of the private MPD. In one embodiment, the additional period information may be the private MPD itself. In one embodiment, the broadcaster-provided application only returns DASH Period elements and/or parameters for replaceable sub-periods that occur now or later, not for replaceable sub-periods that have already passed. However, DASH Period elements and/or parameters for passed replaceable sub-periods may be provided in certain embodiments, for example when the MP is capable of being viewed in a time-shifted manner. Further, the application response creates an edit to the first MPD (e.g., the public MPD) in certain embodiments. For example, if an XLink is resolved, the application response replaces the entire DASH Period.

Figure 11:
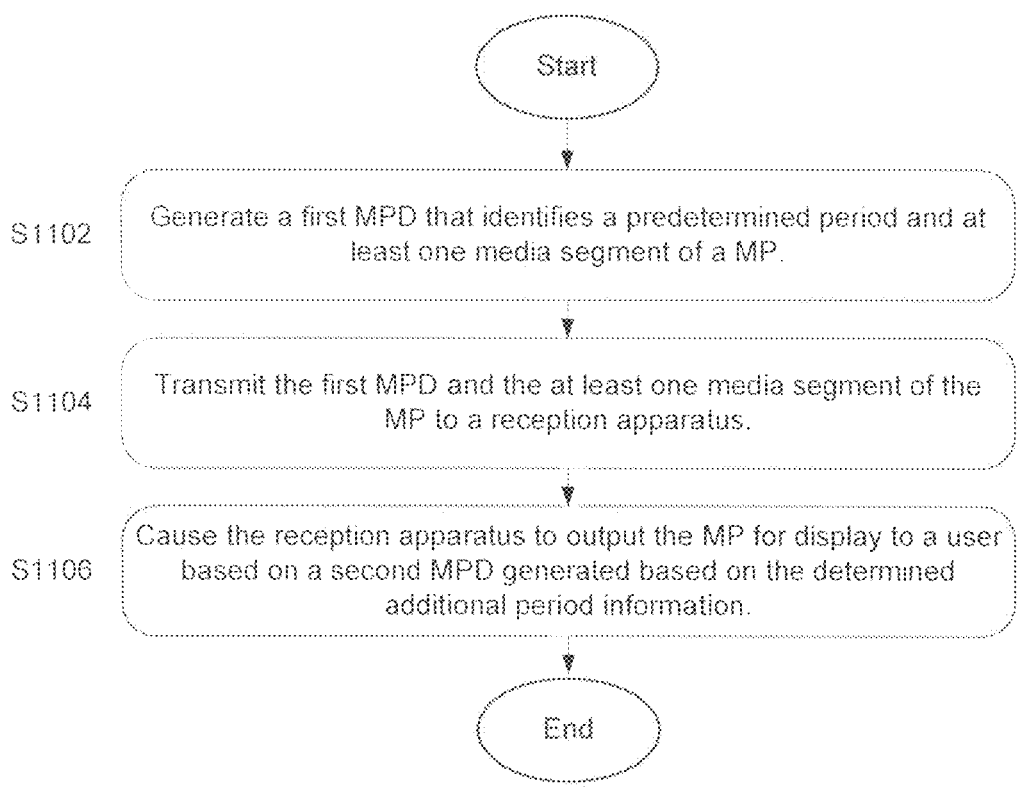
FIG. 11 illustrates a method for signaling a hidden replaceable period of the MP according to one embodiment.

FIG. 11 provides an overview of an exemplary method of an information providing apparatus (e.g., a transmission apparatus) for signaling a hidden replaceable period of a MP. In step S1102, circuitry of the information providing apparatus 350 (e.g., a processor implementing the MPD generator 352) generates a first MPD that identifies a predetermined period (e.g., as defined by a DASH Period element) and at least one Media Segment of the MP to be presented during the predetermined period. For example, the circuitry generates the public MPD 502 illustrated in FIGS. 5A-5B. The MPD includes additional data (e.g., tagged by the XLink) to be resolved by a broadcaster-provided, or other authorized, application executed on the reception apparatus 20 to determine additional period information identifying the replaceable sub-period within the predetermined period. In step S1104, the circuitry transmits the first MPD and the at least one Media Segment of the MP to the reception apparatus 20. The circuitry may also transmit at least one alternate Media Segment in one embodiment. The transmission by the circuitry may be by terrestrial broadcast and/or via a broadband delivery path (e.g., the Internet). In step S1106, the reception apparatus 20 is caused to output the MP for display to a user based on a second MPD, which is generated based on the determined additional period information. Each of a subset of the at least one Media Segment of the MP is replaceable with an alternate Media Segment.

Figure 12:
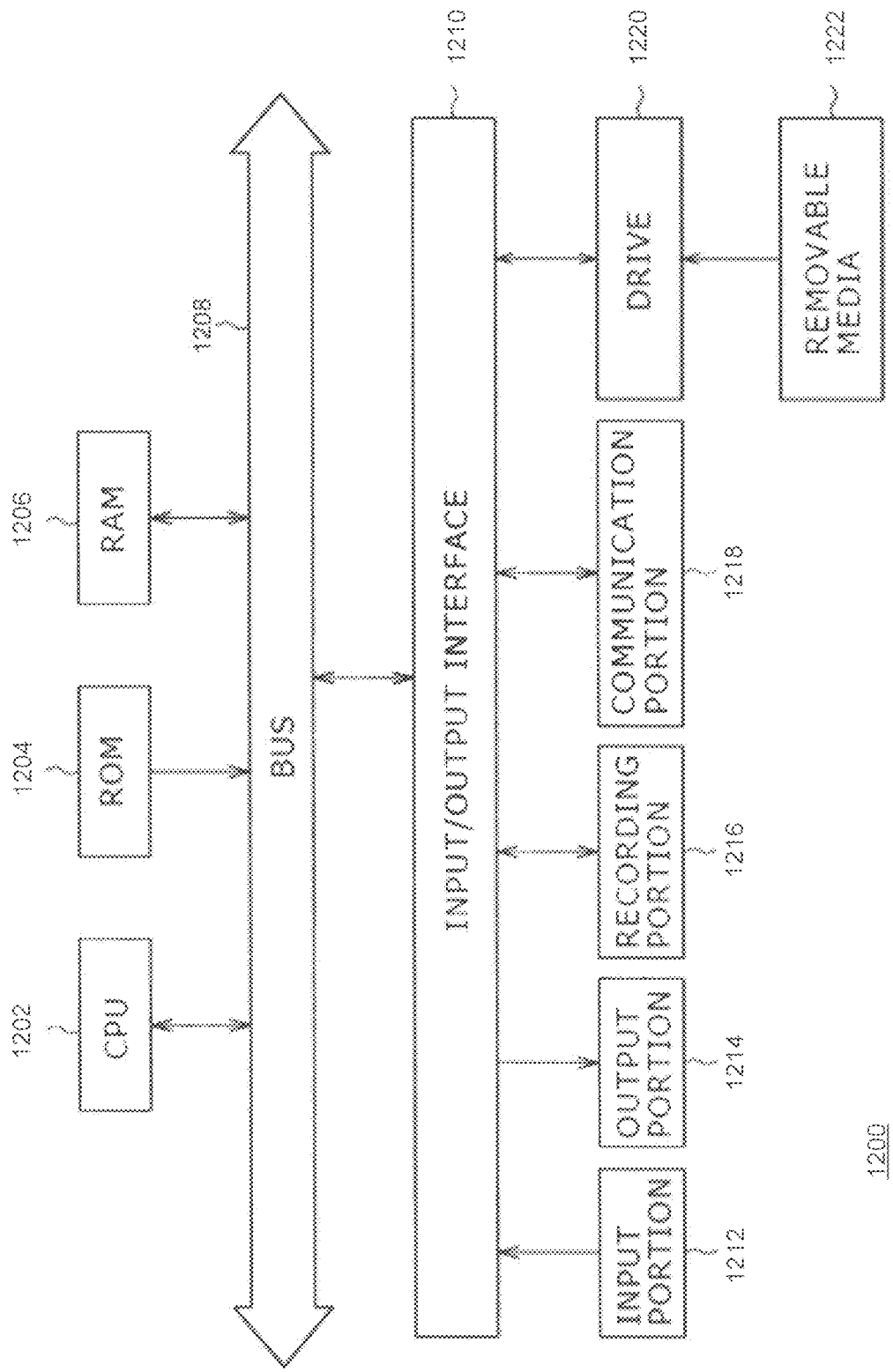
FIG. 12 is an exemplary computer.

FIG. 12 is a block diagram showing an example of a hardware configuration of a computer 900 configured to function as, or control, any one or a combination of the content provider 10 (e.g., information providing apparatus 352), reception apparatus 20, and/or the one or more servers 40.

As illustrated in FIG. 12, the computer 1200 includes a central processing unit (CPU) 1202, read only memory (ROM) 1204, and a random access memory (RAM) 1206 interconnected to each other via one or more buses 1208. The one or more buses 1208 is further connected with an input-output interface 1210. The input-output interface 1210 is connected with an input portion 1212 formed by a keyboard, a mouse, a microphone, remote controller, etc. The input-output interface 1210 is also connected to a output portion 1214 formed by an audio interface, video interface, display, speaker, etc.; a recording portion 1216 formed by a hard disk, a non-volatile memory, etc.; a communication portion 1218 formed by a network interface, modem, USB interface, FireWire interface, etc.; and a drive 1220 for driving removable media 1222 such as a magnetic disk, an optical disk, a magneto-optical disk, a semiconductor memory, etc.

According to one embodiment, the CPU 1202 loads a program stored in the recording portion 1216 into the RAM 1206 via the input-output interface 1210 and the bus 1208, and then executes a program configured to provide the functionality of the one or combination of the content provider 10, reception apparatus 20, ACR system 40, and auxiliary content server 50.

The various processes discussed above need not be processed chronologically in the sequence depicted as flowcharts; the steps may also include those processed parallelly or individually (e.g., in paralleled or object-oriented fashion).

Also, the programs may be processed by a single computer or by a plurality of computers on a distributed basis. The programs may also be transferred to a remote computer or computers for execution.

Furthermore, in this specification, the term "system" means an aggregate of a plurality of component elements (apparatuses, modules (parts), etc.). All component elements may or may not be housed in a single enclosure. Therefore, a plurality of apparatuses each housed in a separate enclosure and connected via a network are considered a network, and a single apparatus formed by a plurality of modules housed in a single enclosure are also regarded as a system.

Also, it should be understood that this technology when embodied is not limited to the above-described embodiments and that various modifications, variations and alternatives may be made of this technology so far as they are within the spirit and scope thereof.

For example, this technology may be structured for cloud computing whereby a single function is shared and processed in collaboration among a plurality of apparatuses via a network.

Also, each of the steps explained in reference to the above-described flowcharts may be executed not only by a single apparatus but also by a plurality of apparatuses in a shared manner.

Furthermore, if one step includes a plurality of processes, these processes included in the step may be performed not only by a single apparatus but also by a plurality of apparatuses in a shared manner.

Numerous modifications and variations of the embodiments of the present disclosure are possible in light of the above teachings. It is therefore to be understood that within the scope of the appended claims, the embodiments may be practiced otherwise than as specifically described herein.

In certain embodiments, the application is programmed to identify one or more media segments for the hidden period based on user profile and/or preference information, such as cookies (past viewing, or past answers to questions), custom logic, and/or a user's Profile, Demographics, and Interests (PDI) defined in ATSC Candidate Standard: Interactive Services Standard (A/105:2015), S13-2-389r8, Rev. 8, Apr. 8, 2015, which is incorporated herein by reference in its entirety. In another embodiment, the application is programmed to provide the user profile and/or profile information to a server, which identifies the one or more media segments. For example, the application may be programmed with a plurality of different advertisement options and to select one or more of the different advertisement options based on the user profile and/or reference information. The selection may be based on user profile information such as geographic location, age, etc. and/or user preference information such as sport interests, hobbies, etc. Further, in one embodiment, the application is programmed to acquire the user profile and/or preference information from the user, for example by presenting a questionnaire.

Although embodiments of the present disclosure have been described in which a hidden period corresponds to an available advertisement slot, the present disclosure is not so limited. The hidden period may be used identify other replaceable slots in addition, or as an alternative, to the available advertisement slot in other embodiments. For example, the hidden period may be used by a content provider that desires to restrict access to the replaceable slot, such as a slot that can be replaced with targeted news or weather segments (e.g., local news or weather based on a geographic location of a user). The replaceable slots could also be used to allow the content provider to make personalized "playlists" of content, such as music videos or travelogues.

The above disclosure also encompasses the embodiments noted below.

(1) A method of a reception apparatus for determining a hidden replaceable period of a MP (Media Presentation), including receiving, by circuitry of the reception apparatus, a first MPD (Media Presentation Description), the first MPD identifying a predetermined period and at least one media segment of the MP to be presented during the predetermined period; determining whether the first MPD includes additional data to be resolved by an application; providing, by the circuitry, the additional data to the application when the first MPD is determined to include the additional data; receiving additional period information from the application, the additional period information being determined by the application based on the additional data and identifying a replaceable sub-period within the predetermined period; generating, by the circuitry, a second MPD based on the received additional period information; and outputting, by the circuitry, the MP for display to a user based on the second MPD, each of a subset of the at least one media segment for the replaceable sub-period of the MP being replaceable with an alternate media segment.

(2) The method according to feature (1), in which the replaceable sub-period represents one or more advertisement slots in the MP that are replaceable.

(3) The method according to feature (1) or (2), in which the second MPD identifies the alternate media segment that replaces one of the at least one media segment identified in the received first MPD.

(4) The method according to any one of features (1) to (3), in which the additional period information includes a period start time and/or a segment start number for the replaceable sub-period, and the replaceable sub-period replaces a portion of the predetermined period.

(5). The method according to any one of features (1) to (4), in which at least one parameter included in the additional period information is encrypted in the additional data.

(6) The method according to any one of features (1), to (5), in which the additional data is tagged by an XLink for the predetermined period of the first MPD.

(7). The method according to any one of features (1) to (6), further including receiving a digital television signal that includes the first MPD and the at least one media segment of the first MPD, and downloading the application from the received digital television signal or based on information included in the received digital television signal.

(8) A reception apparatus, including circuitry configured to receive a first MPD (Media Presentation Description), the first MPD identifying a predetermined period and at least one media segment of a MP (Media Presentation) to be presented during the predetermined period; determine whether the first MPD includes additional data to be resolved by an application; provide the additional data to the application when the first MPD is determined to include the additional data; receive additional period information from the application, the additional period information being determined by the application based on the additional data and identifying a replaceable sub-period within the predetermined period; generate a second MPD based on the received additional period information; and output the MP for display to a user based on the second MPD. Each of a subset of the at least one media segment for the replaceable sub-period of the MP is replaceable with an alternate media segment.

(9) The reception apparatus according to feature (8), in which the replaceable sub-period represents one or more advertisement slots in the MP that are replaceable.

(10) The reception apparatus according to feature (8) or (9), in which the second MPD identifies the alternate media segment that replaces one of the at least one media segment identified in the received first MPD.

(11) The reception apparatus according to any one of features (8) to (10), in which the additional period information includes a period start time and/or a segment start number for the replaceable sub-period, and the replaceable sub-period replaces a portion of the predetermined period.

(12) The reception apparatus according to any one of features (8) to (11), in which at least one parameter included in the additional period information is encrypted in the private data.

(13) The reception apparatus according to any one of features (8) to (12), in which the additional data is tagged by an XLink for the predetermined period of the first MPD.

(14) The reception apparatus according to any one of features (8) to (13), in which the circuitry is further configured to receive a digital television signal that includes the first MPD and the at least one media segment of the first MPD, and download the application from the received digital television signal or based on information included in the received digital television signal.

(15) A method of an information providing apparatus for signaling a hidden replaceable period of a MP (Media Presentation), the method including generating, by circuitry of an information providing apparatus, a first MPD (Media Presentation Description) that identifies a predetermined period and at least one media segment of the MP to be presented during the predetermined period, the first MPD including additional data to be resolved by an application executed on a reception apparatus to determine additional period information identifying a replaceable sub-period within the predetermined period; and transmitting, by the circuitry, the first MPD and the at least one media segment of the MP to the reception apparatus, in which the reception apparatus outputs the MP for display to a user based on a second MPD generated based on the determined additional period information. Each of a subset of the at least one media segment for the replaceable sub-period of the MP is replaceable with an alternate media segment.

(16) The method according to feature (15), in which the replaceable sub-period represents one or more advertisement slots in the MP that are replaceable.

(17) The method according to feature (15) or (16), in which at least one parameter included in the additional period information is encrypted in the additional data.

(18) The method according to any one of features (15) to (17), further including transmitting a digital television signal that includes the first MPD and the at least one media segment of the first MPD.

(19) An information providing apparatus, including circuitry configured to generate a first MPD (Media Presentation Description) that identifies a predetermined period and at least one media segment of a MP (Media Presentation) to be presented during the predetermined period, the first MPD including additional data to be resolved by an application executed on a reception apparatus to determine additional period information identifying a replaceable sub-period within the predetermined period, and transmit the first MPD and the at least one media segment of the MP to the reception apparatus, in which the reception apparatus outputs the MP for display to a user based on a second MPD generated based on the determined additional period information. Each of a subset of the at least one media segment for the replaceable sub-period of the MP is replaceable with an alternate media segment.

(20) The information providing apparatus according to claim 19, in which the replaceable sub-period represents one or more advertisement slots in the MP that are replaceable.

(21) The information providing apparatus according to feature (19) or (20), in which at least one parameter included in the additional period information is encrypted in the additional data.

(22) The information providing apparatus according to any one of features (19) to (21), in which the circuitry is further configured to transmit a digital television signal that includes the first MPD and the at least one media segment of the first MPD.

(23) A non-transitory computer-readable medium storing instructions which when executed by a computer causes the computer to perform a method of an application for determining additional period information for a hidden replaceable period of a MP (Media Presentation), the method including receiving additional data to be resolved by the application and extracted from a first MPD (Media Presentation Description), the first MPD identifying a predetermined period and at least one media segment of the MP to be presented during the predetermined period; generating the additional period information based on the received additional data, the additional period information identifying a replaceable sub-period within the predetermined period; and outputting the generated additional period information for generation of a second MPD.

(24) The non-transitory computer-readable medium according to feature (23), in which the step of generating further includes decrypting the received additional data; and extracting at least one parameter included in the additional period information from the decrypted additional data.

(25) The non-transitory computer-readable medium according to feature (23) or (24), wherein the step of generating further includes determining at least one parameter include in the additional period information based on an identifier included in the additional data and a look up table defined in the application or stored in a remote server.

(26) A non-transitory computer-readable medium storing instructions which when executed by a computer causes the computer to perform the method for determining the hidden replaceable period of the MP according to any one of features (1) to (7).

(27) A non-transitory computer-readable medium storing instructions which when executed by a computer causes the computer to perform the method for determining the hidden replaceable period of the MP according to any one of features (1) to (7).

(28) A non-transitory computer-readable medium storing instructions which when executed by a computer causes the computer to perform the method for signaling the hidden replaceable period of the MP according to any one of features (15) to (18).

The invention claimed is:

1. A method of a reception apparatus, comprising:
receiving, by circuitry of the reception apparatus, a public media presentation description (MPD), the public MPD identifying a period and at least one media segment to be presented during the period, the public MPD including an XLink within the period;
determining, using an authorized application, additional period information based on the XLink, the additional period information including timing information of a replaceable sub-period within the period identified in the public MPD, wherein the timing information is not included in the public MPD;

obtaining a private MPD based on the additional period information; and replacing, in accordance with the private MPD, a media segment associated with the replaceable sub-period with an alternate media segment.

2. The method according to claim 1, wherein the replaceable sub-period indicates the media segment of the public MPD as a default media segment.

3. The method according to claim 1, wherein the additional period information is the private MPD.

4. The method according to claim 1, wherein the private MPD identifies the alternate media segment.

5. The method according to claim 1, further comprising:
receiving a digital television signal that includes the public MPD and the at least one media segment, and downloading the authorized application from the received digital television signal or based on download information included in the received digital television signal.

6. The method according to claim 1, wherein:
resolution of the Xlink yields at least three sub-periods including the replaceable sub-period, and
the at least three sub-periods replace the period.

7. A non-transitory computer-readable medium storing instructions which when executed by a computer causes the computer to perform the method according to claim 1.

8. A reception apparatus, comprising:
circuitry configured to:
receive a public media presentation description (MPD), the public MPD identifying a period and at least one media segment to be presented during the period, the public MPD including an XLink within the period;
determine, using an authorized application, additional period information based on the XLink, the additional period information including timing information of a replaceable sub-period within the period identified in the public MPD, wherein the timing information is not included in the public MPD;
obtain a private MPD based on the additional period information; and
replace, in accordance with the private MPD, a media segment associated with the replaceable sub-period with an alternate media segment.

9. The reception apparatus according to claim 8, wherein the replaceable sub-period indicates the media segment as a default media segment.

10. The reception apparatus according to claim 8, wherein the additional period information is the private MPD.

11. The reception apparatus according to claim 8, wherein the private MPD identifies the alternate media segment.

12. The reception apparatus according to claim 8, wherein the circuitry is further configured to:
receive a digital television signal that includes the public MPD and the at least one media segment, and download the authorized application from the received digital television signal or based on download information included in the received digital television signal.

13. The reception apparatus according to claim 8, wherein:
resolution of the Xlink yields at least three sub-periods including the replaceable sub-period, and
the at least three sub-periods replace the period.

14. The reception apparatus according to claim 8, wherein the timing information includes at least one of a start time or a segment start number for the replaceable sub-period.

15. The reception apparatus according to claim 8, wherein the circuitry is configured to:
register the authorized application to receive XLink notification;
notify the authorized application of the XLink included in the public MPD; and
execute the authorized application.

16. A method of an information providing apparatus, the method comprising:
generating, by circuitry of the information providing apparatus, a public media presentation description (MPD), the public MPD identifying a period and at least one media segment to be presented during the period, the public MPD including an XLink within the period; and
providing the public MPD to a reception apparatus, wherein:
a private MPD is obtained in the reception apparatus based on additional period information that is determined based on the XLink by an authorized application, the additional period information including timing information of a replaceable sub-period within the period identified in the public MPD, wherein the timing information is not included in the public MPD, and
a media segment associated with the replaceable sub-period is replaced, in accordance with the private MPD, with an alternate media segment in the reception apparatus.

17. The method according to claim 16, wherein the replaceable sub-period indicates the media segment as a default media segment.

18. The method according to claim 16, wherein the additional period information is the private MPD.

19. The method according to claim 16, wherein the private MPD identifies the alternate media segment.

20. The method according to claim 16, further comprising:
transmitting a digital television signal that includes the public MPD and the at least one media segment.

21. The method according to claim 16, wherein resolution of the Xlink yields at least three sub-periods including the replaceable sub-period and the at least three sub-periods replace the period.

* * * * *